(12) United States Patent
Wells et al.

(10) Patent No.: US 10,073,234 B2
(45) Date of Patent: Sep. 11, 2018

(54) TUBING FOR EQUALIZING LENGTHS OF FIBER OPTIC RIBBONS OF A RIBBON STACK IN DISTRIBUTION FRAMES/CABINETS/TRAYS

(71) Applicant: CommScope Technologies LLC, Hickory, NC (US)

(72) Inventors: Dennis Ray Wells, Richfield, MN (US); Kamlesh G. Patel, Chanhassen, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/691,291

(22) Filed: Aug. 30, 2017

(65) Prior Publication Data

US 2018/0059352 A1 Mar. 1, 2018

Related U.S. Application Data

(60) Provisional application No. 62/382,047, filed on Aug. 31, 2016.

(51) Int. Cl.
*G02B 6/44* (2006.01)
(52) U.S. Cl.
CPC ......... *G02B 6/4455* (2013.01); *G02B 6/4403* (2013.01); *G02B 6/443* (2013.01); *G02B 6/445* (2013.01); *G02B 6/4457* (2013.01)
(58) Field of Classification Search
None
See application file for complete search history.

(56) References Cited

U.S. PATENT DOCUMENTS 4,129,468 A 12/1978 Knab
4,744,631 A * 5/1988 Eichenbaum ........ G02B 6/4411
385/114

(Continued)

FOREIGN PATENT DOCUMENTS

CA 2 324 089 C 4/2001
WO 2013/049484 A1 4/2013

*Primary Examiner* — Tina Wong
(74) *Attorney, Agent, or Firm* — Merchant & Gould P.C.

(57) ABSTRACT

A system (90) for routing a stack of fiber optic ribbons (100) includes a fiber optic cable (50) and a fiber guide tube (300). The fiber optic cable (50) includes a jacket (54) and a ribbon stack (110). The jacket (54) extends from a first end (56) to a second end (58). The ribbon stack (110) extends from a first end (112) to a second end (114). A jacketed portion (60) of the ribbon stack (110) is surrounded by the jacket (54) from the first end (56) of the jacket (54) to the second end (58) of the jacket (54). The fiber guide tube (300) extends from a first end (302) to a second end (304) along a central longitudinal axis (A1). The fiber guide tube (300) is positioned between the first end (56) of the jacket (54) and the first end (112) of the ribbon stack (110). The fiber guide tube (300) includes a round exterior (308) and an interior (310) with a rectangular cross-section (318). The rectangular cross-section (318) twists about the central longitudinal axis (A1) as the interior (310) extends from the first end (302) to the second end (304) of the fiber guide tube (300). A tubed portion (120) of the ribbon stack (110) is surrounded and twisted by the interior (310) of the fiber guide tube (300) from the first end (302) to the second end (304) of the fiber guide tube (300).

20 Claims, 15 Drawing Sheets

(56) References Cited

U.S. PATENT DOCUMENTS

| | | |
|---|---|---|
| 5,212,756 A | 5/1993 | Eoll |
| 5,621,842 A | 4/1997 | Keller |
| 6,185,352 B1 | 2/2001 | Hurley |
| 6,215,938 B1 | 4/2001 | Reitmeier et al. |
| 6,256,439 B1 | 7/2001 | Brown et al. |
| 6,295,401 B1 | 9/2001 | Rutterman et al. |
| 6,317,542 B1 | 11/2001 | Hardwick, III et al. |
| 6,556,763 B1 | 4/2003 | Puetz et al. |
| 8,805,144 B1 | 8/2014 | McAlpine et al. |
| 2013/0022325 A1 | 1/2013 | Kachmar |
| 2014/0199037 A1 | 7/2014 | Hurley et al. |
| 2018/0059352 A1* | 3/2018 | Wells .................. G02B 6/4455 |

* cited by examiner

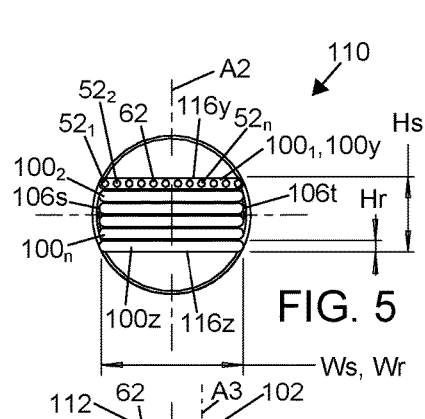
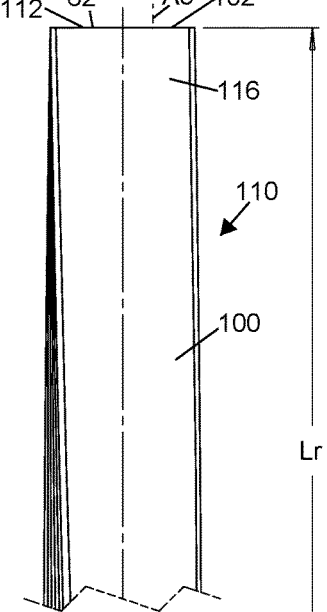
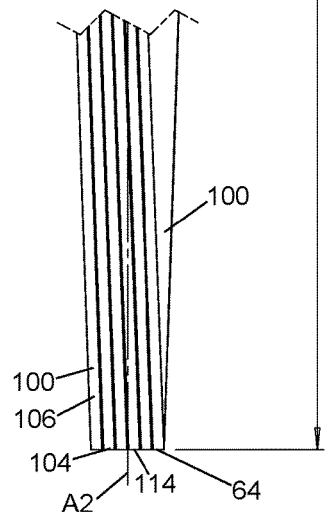
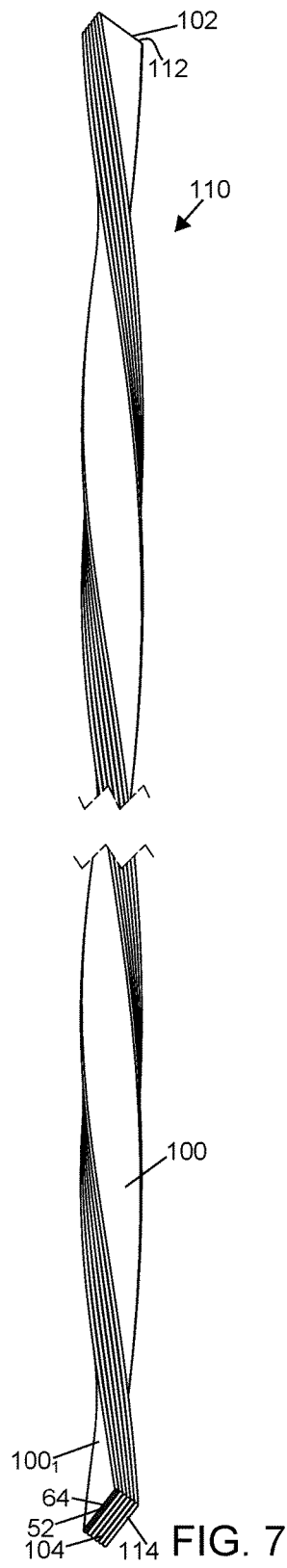
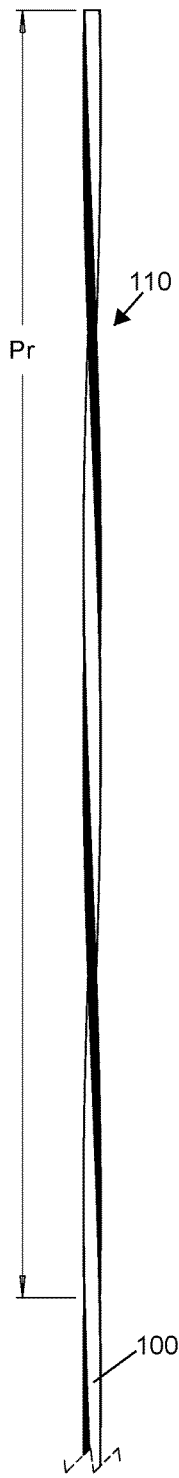
FIG. 5  FIG. 6  FIG. 7  FIG. 8

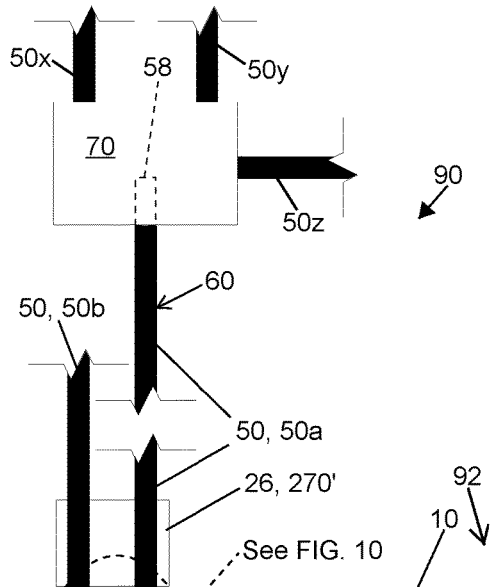

TUBING FOR EQUALIZING LENGTHS OF FIBER OPTIC RIBBONS OF A RIBBON STACK IN DISTRIBUTION FRAMES/CABINETS/TRAYS

CROSS REFERENCE TO RELATED APPLICATION

This application claims the benefit of provisional application Ser. No. 62/382,047, filed Aug. 31, 2016, which is incorporated herein by reference in its entirety.

TECHNICAL FIELD

The present disclosure relates to handling and routing optical fibers arranged in optical fiber ribbons arranged in ribbon stacks. In particular, the present disclosure relates to routing ribbon stacks within racks, frames, or cabinetry that holds optical components, including splice trays, that interface with the optical fibers, the optical fiber ribbons, and/or the ribbon stacks.

BACKGROUND

In the field of fiber optic telecommunications, there is a need to optically connect various optical fibers together to complete optical circuits. The optical fibers are often optically connected together within racks, frames, and/or cabinets (hereinafter "cabinetry" or "cabinets") to connect and thereby complete the optical circuits. The cabinets may further include various optical components. The optical fibers may be routed to, from, and between various cabinets with the optical fibers protected within various optical fiber cables. The cabinets may be remotely located from each other and/or from the optical components to which the optical fiber cables are routed. The optical fibers may be routed between various optical components within the cabinets.

In certain applications, the optical fibers may be ribbonized. A ribbon including ribbonized optical fibers may include a plurality of the optical fibers bonded together side-by-side with a suitable material (e.g., polymer materials, tapes, etc.).

There is a need to route optical fiber ribbons and/or optical fiber ribbon stacks within cabinets and frames such as those illustrated at U.S. Pat. Nos. 6,215,938 and 6,556,763. In addition, there is a need to route optical fiber ribbons and/or ribbon stacks to, from, and/or around splice trays, such as those illustrated at U.S. Pat. Nos. 6,215,938 and 6,556,763. In particular, there is a need to route optical fiber ribbons and/or optical fiber ribbon stacks to, from, and around the splice trays as the splice trays are removed from and installed into the cabinets and/or the frames.

SUMMARY OF THE DISCLOSURE

The present disclosure relates to a system for routing a stack of fiber optic ribbons. The system includes a fiber optic cable and a fiber guide tube. The fiber optic cable includes a jacket and a ribbon stack. The jacket extends from a first end to a second end. The ribbon stack extends from a first end to a second end. A jacketed portion of the ribbon stack is surrounded by the jacket from the first end of the jacket to the second end of the jacket. The fiber guide tube extends from a first end to a second end along a central longitudinal axis. The fiber guide tube is positioned between the first end of the jacket and the first end of the ribbon stack. The fiber guide tube includes a round exterior and an interior with a rectangular cross-section. The rectangular cross-section twists about the central longitudinal axis as the interior extends from the first end of the fiber guide tube to the second end of the fiber guide tube. A tubed portion of the ribbon stack is surrounded and twisted by the interior of the fiber guide tube from the first end of the fiber guide tube to the second end of the fiber guide tube.

Other aspects of the present disclosure relate to an optical fiber ribbon guide tube that includes a tube body. The tube body extends from a first end to a second end along a central longitudinal axis. The tube body includes a round exterior and an interior with a rectangular cross-section. The round exterior extends from the first end to the second end of the tube body along the central longitudinal axis. The rectangular cross-section twists about the central longitudinal axis as the interior extends from the first end to the second end of the tube body. The rectangular cross-section defines opposite sides about the central longitudinal axis. The opposite sides are configured to engage a ribbon stack and thereby twist the ribbon stack when the ribbon stack is inserted through the interior of the tube body. The tube body is adapted to route the ribbon stack along a curved path.

Still other aspects of the present disclosure relate to an assembly of an optical fiber ribbon guide tube and a stack of fiber optic ribbons. The assembly includes a tube body and a plurality of the fiber optic ribbons. The tube body extends from a first end to a second end along a central longitudinal axis. The tube body includes a round exterior and an interior with a rectangular cross-section. The round exterior extends from the first end to the second end of the tube body along the central longitudinal axis. The rectangular cross-section twists about the central longitudinal axis as the interior extends from the first end to the second end of the tube body. The rectangular cross-section defines opposing sides about the central longitudinal axis. The plurality of the fiber optic ribbons is held in a ribbon stack by the rectangular cross-section of the tube body. Each of the fiber optic ribbons includes a plurality of optical fibers that extend from a first end to a second end. The first ends of the plurality of the optical fibers extend beyond the first end of the tube body. The second ends of the plurality of the optical fibers extend beyond the second end of the tube body. The opposing sides engage the ribbon stack and thereby twist the ribbon stack from the first end to the second end of the tube body. The plurality of the fiber optic ribbons slip relative to each other within the interior of the tube body when the tube body routes the ribbon stack along a curved path. The fiber optic ribbons are thereby relieved from compressive loads when the ribbon stack is routed along the curved path.

Yet other aspects of the present disclosure relate to a method of installing a stack of fiber optic ribbons in a ribbon guide tube. The method includes providing a plurality of the fiber optic ribbons, providing a tube body, inserting a first end of each of the plurality of the fiber optic ribbons into the second end of the tube body, feeding each of the plurality of the fiber optic ribbons into the second end of the tube body until the first ends of the plurality of the fiber optic ribbons protrude a desired length beyond the first end of the tube body, twisting the plurality of the fiber optic ribbons, and holding the plurality of the fiber optic ribbons in a twisted configuration. The tube body extends from a first end to a second end along a central longitudinal axis. The tube body includes a round exterior extending from the first end to the second end of the tube body along the central longitudinal axis. Twisting the plurality of the fiber optic ribbons thereby matches the fiber optic ribbons to an interior of the tube body that has a twisted rectangular cross-section. The twisted rectangular cross-section extends from the first end to the second end of the tube body. The twisted rectangular cross-section of the tube body holds the plurality of the fiber optic ribbons in a twisted configuration.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 5 is an axial plan view of a ribbon stack as it would be twisted upon insertion into the tube of FIG. 1, shown in isolation;

FIG. 6 is a broken longitudinal view of the twisted ribbon stack of FIG. 5;

FIG. 7 is a broken perspective view of the twisted ribbon stack of FIG. 5;

FIG. 8 is a partial longitudinal view of the twisted ribbon stack of FIG. 5;

FIG. 9 is a schematic illustration of a system including the tube of FIG. 1 and a fiber optic cabinet with a spool, according to the principles of the present disclosure;

FIG. 10 is an enlarged portion of FIG. 9;

DETAILED DESCRIPTION

Figure 1:
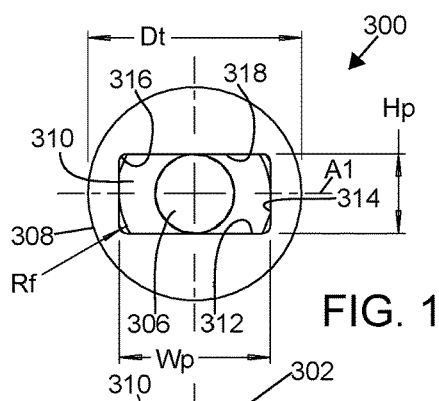
FIG. 1 is an axial plan view of an example tube, according to the principles of the present disclosure.

Referring to FIGS. 1-4, an example embodiment of a tube 300 is illustrated, according to the principles of the present disclosure. The tube 300 may be used to equalize lengths of fiber optic ribbons of a ribbon stack in a distribution frame, a cabinet, a tray, etc. As illustrated at FIG. 1, the tube 300 includes an exterior 308 and an interior 310. As depicted, the exterior 308 is circular in cross-section and likewise cylindrical when the tube 300 is held straight along its axis A1. The circular exterior cross-section and/or the cylinder defined by the exterior 308 may be defined by a diameter Dt. As depicted, the interior 310 includes a cross-section 318 that is rectangular. As depicted, the rectangular cross-section 318 may be defined by a height Hp and a width Wp. As depicted, the width Wp is greater than the height Hp. In other embodiments, the height Hp may be greater than or equal to the width Wp. As illustrated at FIG. 1, a pair of sides 312 are positioned opposite each other about the axis A1 and are substantially parallel to each other. The sides 312 are spaced from each other by the height Hp. Likewise, a pair of sides 314 are positioned opposite each other about the axis A1 and are substantially parallel to each other. The sides 312 are substantially perpendicular to the sides 314 and thereby define the rectangular cross-section 318. In other embodiments, the sides 312 and the sides 314 may not be perpendicular to each other and thereby define a trapezoidal cross-section. As depicted, the sides 312 intersect the sides 314 at corners 316. As depicted, the corners 316 are filleted corners. The sides 312, the sides 314, and the corners 316 thereby define the interior 310 of the tube 300 and thereby define a passage 306 that extends through the tube 300. As depicted, the filleted corners 316 may include a fillet radius Rf. In other embodiments, the corners 316 may be sharp corners or may have fillets, chamfers, undercuts, etc. that are not necessarily radiused.

As depicted, the tube 300 extends straight, and the axis A1 is linear. However, the tube 300 is made of a flexible material that may be bent about an axis locally perpendicular to the tube axis A1. The tube axis A1 follows the tube 300 along a routing path along which the tube 300 is routed. As depicted, the tube axis A1 is positioned at a centroid of the rectangular cross-section 318 of the tube 300. A tube body 320 of the tube 300 is defined between the exterior 308 and the interior 310. As depicted, the tube body 320 may be monolithic and extend between the exterior 308 and the interior 310 without joints, interruptions, dissimilar materials, etc.

Figure 2:
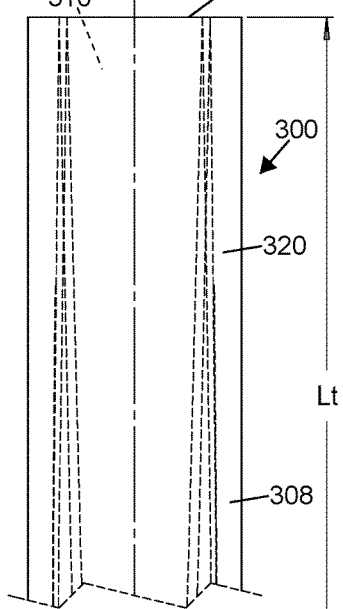
FIG. 2 is a broken longitudinal view of the tube of FIG. 1.
Figure 3:
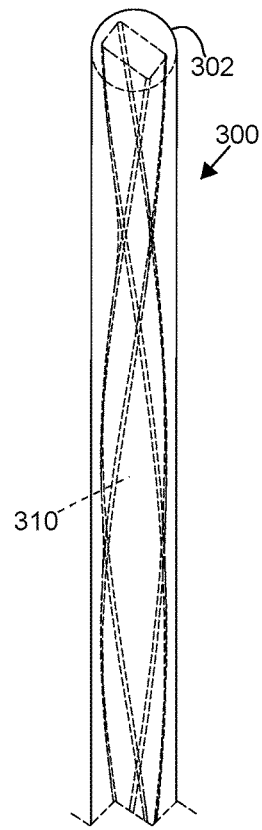
FIG. 3 is a broken perspective view of the tube of FIG. 1.
Figure 4:
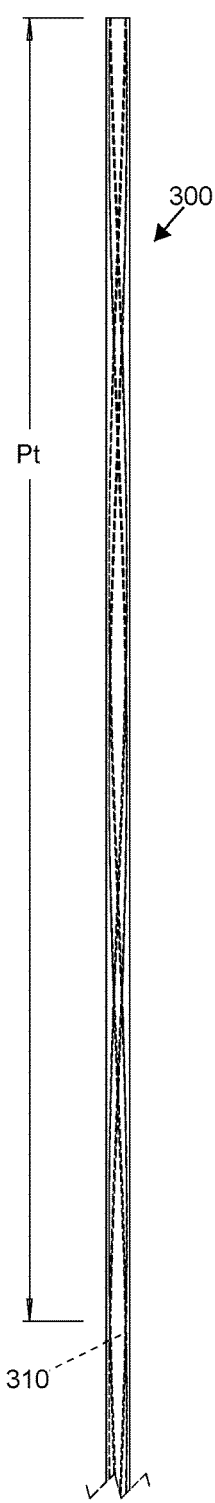
FIG. 4 is a partial longitudinal view of the tube of FIG. 1.

As illustrated at FIGS. 2 and 3, the tube 300 extends between a first end 302 and a second end 304. A length Lt of the tube 300 is defined by a spacing between the first end 302 and the second end 304. As depicted at FIGS. 2-4, the rectangular cross-section 318 twists as the tube 300 extends between the first end 302 and the second end 304. In the depicted embodiment, the twist is a left-hand helical twist. In other embodiments, the twist may be a right-hand helical twist. As depicted, the twist has a pitch Pt. As depicted, the pitch Pt is constant and is defined by the rectangular cross-section 318 rotating about the axis A1 360 degrees. In other embodiments, the pitch Pt may be variable. As further illustrated at FIG. 11, the tube 300 includes a first end portion 322 adjacent the first end 302. As illustrated at FIG. 10, the tube 300 includes a second end portion 324 adjacent the second end 304 of the tube 300.

FIGS. 5-8 illustrate an example ribbon 100 with twelve example optical fibers 52 arranged side-by-side. As illustrated, in certain applications, a plurality of the ribbons 100 may be stacked upon each other and thereby form a ribbon stack. FIGS. 5-8 further illustrate an example ribbon stack 110 with six of the ribbons 100. Such ribbons 100 and such ribbon stacks 110 allow high densities of optical fibers 52 to be routed together and thereby complete optical circuits arranged in high densities.

Figure 11:
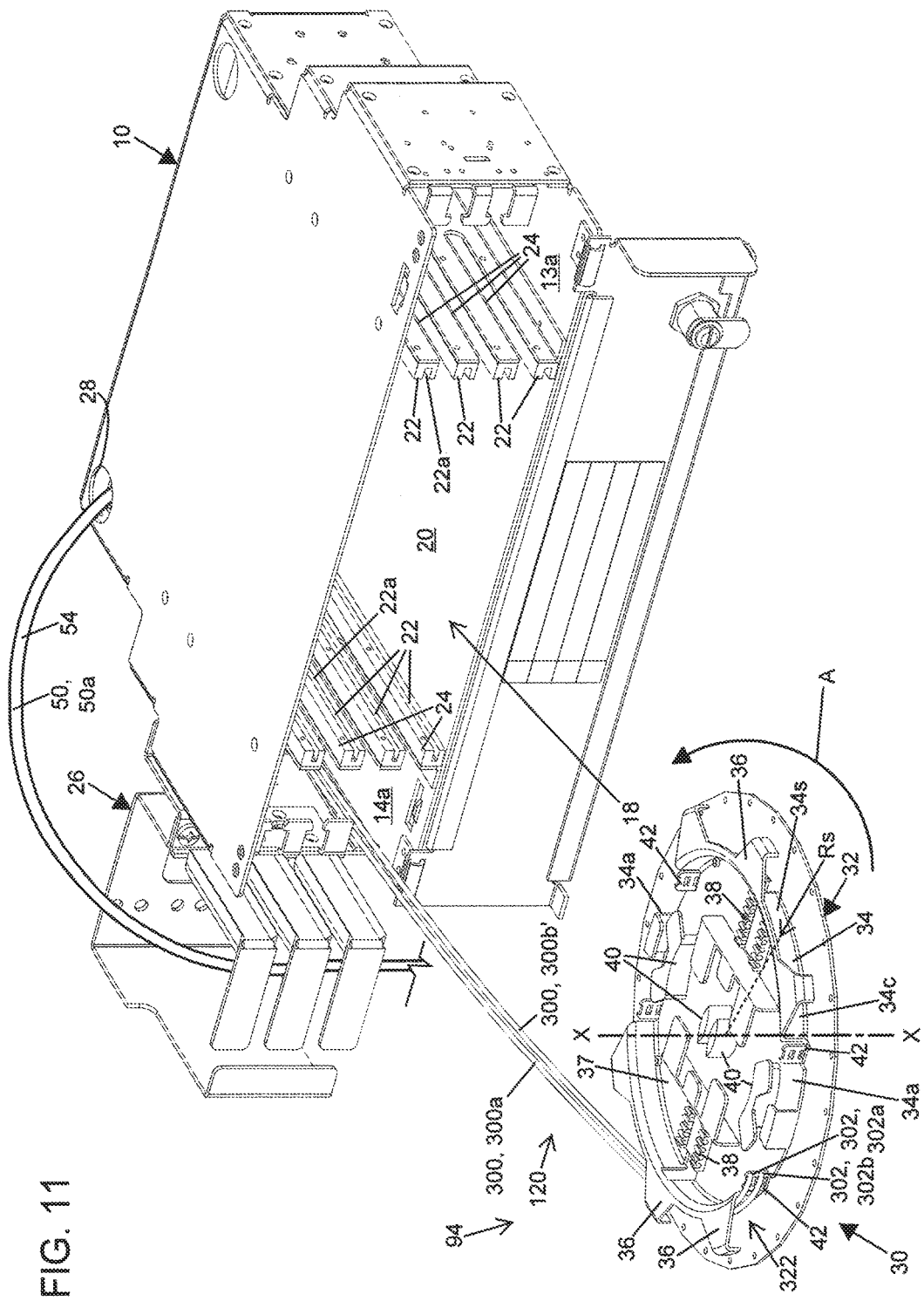
FIG. 11 is a front, top, and right side perspective view of the tube of FIG. 1 and a cabinet including a tray shown removed from the cabinet without a cover, according to the principles of the present disclosure.

The ribbons 100 and/or the ribbon stacks 110 may be routed to, from, and/or between various cabinets with the optical fibers 52, the ribbons 100, and/or the ribbon stacks 110 protected within various optical fiber cables. An example optical fiber cable 50, 50*a* with a cable jacket 54 is illustrated at FIG. 11. Certain optical fiber cables 50 may be suited for indoor use. Certain optical fiber cables 50*a*, 50*b*, 50*x*, 50*y*, 50*z* may be routed through harsh outdoor environments (e.g., between utility poles, in underground trenches, etc.). The cable jackets 54 of the optical fiber cables 50*a*, 50*b*, 50*x*, 50*y*, 50*z* may therefore be heavy and stiff. Such cable jackets 54 may include multiple layers (i.e., multiple plies) for strength and durability. The optical fiber cables 50*a*, 50*b*, 50*x*, 50*y*, 50*z* may further include strength members, water blocking gel, etc. The optical fiber cables 50*a*, 50*b*, 50*x*, 50*y*, 50*z* may include multiple optical fibers 52, multiple ribbons 100, and/or multiple ribbon stacks 110 within the same cable jacket 54. The cable jackets 54 of the optical fiber cables 50*a*, 50*b*, 50*x*, 50*y*, 50*z* may therefore be large in size (e.g., outside diameter). As such optical fiber cables 50*a*, 50*b*, 50*x*, 50*y*, 50*z* may be large, stiff, and/or include multiple ribbon stacks 110, such optical fiber cables 50*a*, 50*b*, 50*x*, 50*y*, 50*z* may not be suited for routing within cabinets, especially compact cabinets and/or cabinets with high optical circuit density. FIG. 11 illustrates the example optical fiber cables 50, 50*a* routed to an example cabinet 10 (i.e., a housing).

There is a need to route the optical fibers 52, the ribbons 100, and the ribbon stacks 110 within various cabinets. Optical fibers 52, ribbons 100, and ribbon stacks 110 may be bent and still permit an optical signal to be transmitted along the bent optical fibers 52. There may be a bending limit upon which the optical fibers 52, the ribbons 100, and/or the ribbon stacks 110 structurally fail and/or may unacceptably impede the optical signal, if the bending limit is exceeded. However, the bending limit of the optical fibers 52 and/or the ribbons 100 may allow relatively tight bends and therefore allow routing within cabinets, including compact cabinets and/or cabinets with high optical circuit density. The routing of the optical fibers 52 may include winding of the optical fibers 52 about a tray. For Example, FIG. 11 also illustrates an example splice tray 30.

Individual optical fibers 52 may be flexible in bending along any axis locally normal to a lengthwise axis A3 (see FIG. 6) of the optical fiber 52. The lengthwise axis A3 follows the optical fiber 52 along its axial length Lr (see FIG. 6), including along bends along which the optical fiber 52 and/or the corresponding ribbon 100 and/or the corresponding ribbon stack 110 is routed. The ribbons 100 may be flexible bending about a height Hr of the ribbon 100 (see FIG. 5). The height Hr of the ribbon 100 may be about the same as a diameter of the optical fiber 52, if the bonding material is thin. The ribbon 100 may thereby be bent about the height Hr to about the same degree as the optical fiber 52 may be bent normal to its lengthwise axis A3. The ribbon 100 may be about as flexible bending about the height Hr of the ribbon 100 as an individual optical fiber 52. The ribbon 100 may be substantially less flexible in bending about a width Wr of the ribbon 100 (see FIG. 5). The ribbon 100 may be substantially less flexible than an individual optical fiber 52 when bent about the width Wr of the ribbon 100.

The ribbon stacks 100 may be substantially less flexible than either the ribbons 100 or the individual optical fibers 52. However, the ribbons 100 within the ribbon stack 110 may slip relative to each other thereby improving flexibility of the ribbon stack 110. The ribbons 100 nearer to a center of bending may bunch-up and/or migrate outside an unbent cross-sectional boundary of the ribbon stack 110 as they have a shorter route length than the ribbons 100 farther from the center of bending. This bunching-up and/or migrating may cause macro-bends on the ribbon stack 110 and thereby unacceptably impede the optical signal and/or cause failure of the optical fibers 52, the ribbons 100, and/or the ribbon stacks 110. A method of routing ribbons stacks 110 within cabinets, including compact cabinets and/or cabinets with high optical circuit density is needed that avoids the bunching-up and/or the migrating and the subsequent macro-bending on the ribbon stack 110.

Examples of trays, including the splice tray 30, and a fiber optic cabinet (i.e., the example cabinet 10), are provided at U.S. Pat. No. 6,215,938, incorporated herein by reference in its entirety. U.S. Pat. No. 6,215,938 discloses a system using the fiber optic cabinet 10 with the splice tray 30. The fiber optic cabinet 10 has internal guides 22 to guide the splice tray 30 when the splice tray 30 is inserted into the fiber optic cabinet 10. The splice tray 30 includes a fiber pathway that allows wrapping and unwrapping of optical fibers 52 as the splice tray 30 is installed and removed from the cabinet 10. In this way, the splice tray 30 can be removed from the cabinet 10 by unwinding the fiber pathway from about the splice tray 30. When removed from the cabinet 10, the splice tray 30 may be configured as desired. The splice tray 30 may be returned to the cabinet 10 by rewinding the fiber pathway about the splice tray 30 as the splice tray 30 is reinserted into the cabinet 10. As illustrated at FIG. 1 of U.S. Pat. No. 6,215,938, the optical fibers 52 are routed to the splice tray 30 in fiber optic cables 50.

U.S. Pat. No. 6,556,763 provides examples of frames 20, 220, 420, 520, 620, 920, 1320, 1420 (e.g., fiber distribution frames), at least some of which include splice trays 46. U.S. Pat. No. 6,556,763 is also incorporated herein by reference in its entirety.

As will be further described below, the tube 300 is an optical fiber ribbon guide tube with the tube body 320 extending from the first end 302 to the second end 304 along the axis A1, which is a central longitudinal axis. The tube body 320 includes the round exterior 308 and the interior 310. The round exterior 308 extends from the first end 302 to the second end 304 of the tube body 320 along the axis A1. The interior 310 includes the rectangular cross-section 318 that twists about the axis A1 as the interior 310 extends from the first end 302 to the second end 304 of the tube body 320. The rectangular cross-section 318 defines opposing sides 312 and 314 about the axis A1. The opposing sides 312 and the opposing sides 314 are configured to engage a ribbon stack, such as the aforementioned ribbon stack 110. The opposing sides 312 and/or 314 thereby twist the ribbon stack 110 when the ribbon stack 110 is inserted through the interior 310 of the tube body 320. The tube body 320 is adapted to route the ribbon stack 110 along a curved path. As depicted, the twisting of the ribbon stack 110 corresponds to the twisting of the rectangular cross-section 318.

In the depicted embodiment, the pitch length Pt ranges from about 26 inches to about 34 inches. In other embodiments, the pitch length Pt may be less than 26 inches or greater than 34 inches. The pitch length Pt may be reduced if reduced bend-loss radius fiber is used in the ribbons 100 of the ribbon stack 110. Curvature of the individual fibers 52 of the ribbons 100 of the ribbon stack 110 may stay within minimum bend radius specifications of the type of fiber being inserted into the tube 300. In particular, contributions from the twisting along the tube 300 and the bending along the tube 300, as the tube 300 travels along the curved path, put together are within the minimum bend radius specifications of the type of fiber being inserted into the tube 300.

According to the principles of the present disclosure, a stack of fiber optic ribbons may be assembled into the tube 300. In particular, the aforementioned ribbon stack 110 may be assembled into the tube 300, and the tube 300 may thereby perform as an optical fiber ribbon guide tube. The assembled tube 300 and ribbon stack 110 may be routed as desired with the ribbon stack 110 twisted by the tube 300 along the route. Turning now to FIGS. 5-8, the aforementioned ribbon stack 110 is illustrated as though it were inside the tube 300, but with the tube 300 hidden from view. As depicted, the ribbon stack 110 includes six of the ribbons 100. In particular, the ribbon stack 110 includes ribbons $100_{1-6}$. As depicted, the individual ribbons 100 are labeled with reference number $100_n$, where n refers to the individual ribbon number in the ribbon stack 110.

As illustrated at FIG. 5, the first ribbon $100_1$ is a first opposing ribbon $100y$, and the last ribbon $100_6$ is a second opposing ribbon $100z$. In certain embodiments, outwardly oriented broad sides 116 of the pair of opposing ribbons $100y$, $100z$ may interface with the opposing pair of sides 312. The opposing pair of sides 312 may thereby impart twist on the ribbon stack 110 via the opposing ribbons $100y$, $100z$. The outwardly oriented broad sides 116 of the pair of opposing ribbons $100y$, $100z$ may be spaced from each other and thereby define a height Hs of the ribbon stack 110. A width Ws of the ribbon stack 300 (see FIG. 5) may be substantially the same as the width Wr of the ribbon 100.

As further depicted at FIG. 5, each of the ribbons 100 includes a plurality of the optical fibers 52. As depicted, each of the ribbons 100 includes twelve of the optical fibers 52. In other embodiments, the ribbon 100 may include fewer than twelve fibers 52. In other embodiments, the ribbon 100 may include more than twelve fibers 52. As depicted, the ribbon 100 includes twelve individual fibers $52_{1-12}$. The individual fibers 52 may be identified by reference number $52_n$, where n refers to the position of the individual fiber 52 within the ribbon 100.

As illustrated at FIG. 5, each of the ribbons 100 may include a first side $106s$ and a second side $106t$. The broad sides 116 of each of the ribbons 100 may extend between the side $106s$ and the side $106t$. As depicted, the broad side 116 at the top of the ribbon $100_1$ may define surface $116y$, and the bottom broad side 116 of the ribbon $100_6$ may define surface $116z$. The surfaces $116y$, $116z$ may interface with the opposing pair of sides 312. The sides $106s$, $106t$ together may form opposing sides of the ribbon stack 110. The opposing sides $106s$, $106t$ may individually and/or collectively interface with the opposing sides 314 of the interior 310 of the tube 300. The tube 300 may thereby twist the ribbon stack 110. As depicted, the sides $106s$, $106t$ are narrow sides 106 of the ribbon 100. As depicted, the narrow sides 106 are radiused. As depicted, the narrow sides 106 are radiused and match the filleted corners 316 of the interior 310. The narrow sides 106 of the first ribbon $100_1$ and the narrow sides 106 of the last ribbon $100_6$ may interface with the filleted corners 316 of the tube 300 and thereby impart the twisting of the tube 300 to the ribbon stack 110.

As depicted at FIGS. 6 and 7, the optical fibers 52 each individually extend between a first end 62 and a second end 64. The ribbons 100 each individually extend between a first end 102 and a second end 104. And, the ribbon stack 110 extends between a first end 112 and a second end 114. As illustrated, the ends 62, 102, and 112 are coincident with each other, and the ends 64, 104, and 114 are coincident with each other. In other embodiments, each individual end 62, 64 of the optical fibers 52 may be non-coincident with each other. Likewise, the ends 102, 104 of the ribbons 100 may be non-coincident with each other.

As mentioned above, the ribbon 100 includes ribbonized optical fibers that include a plurality of the optical fibers 52 bonded together side-by-side with a suitable material (e.g., polymer materials, tapes, etc.). The ribbons 100 may come prearranged in the ribbon stack 110 before insertion into the tube 300. In other embodiments, the ribbons 100 are gathered individually and inserted into the tube 300 and thereby form the ribbon stack 110. In certain embodiments, the ribbons 100 are gathered individually and assembled into the ribbon stack 110 and then inserted into the tube 300. The preassembled ribbon stacks may come from one or more ribbon stacks 110 of a fiber optic cable 50, 50a, 50b, 50x, 50y, 50z (see FIG. 9). A jacket 54 of the fiber optic cable 50, 50a, 50b, 50x, 50y, 50z may be stripped away and thereby reveal the ribbon stack 110 and/or individual ribbons 100.

By transitioning the ribbon stack 110 from the fiber optic cable 50a, 50b, 50x, 50y, 50z to the tube 300, additional routing flexibility may be gained as the tube 300, including the ribbon stack 110, may be substantially more flexible and/or more compact than the fiber optic cable 50a, 50b, 50x, 50y, 50z.

As mentioned above, a plurality $110_1$-$100_n$ of the fiber optic ribbons 100 may be held in the ribbon stack 110 by the rectangular cross-section 318 of the tube body 320. Each of the fiber optic ribbons 100 includes a plurality $52_1$-$52_n$ of the optical fibers 52 that extend from the first end 62 to the second end 64. The ends 62 of the plurality $52_1$-$52_n$ of the optical fibers 52 extend beyond the first end 302 of the tube body 320. The second ends 64 of the plurality $52_1$-$52_n$ of the optical fibers 52 may extend beyond the second end 304 of the tube body 320.

The ribbon stack 110 is twisted by the tube body 320 from the first end 302 to the second end 304. The plurality $100_1$-$100_n$ of the fiber optic ribbons 100 may slip relative to each other within the interior 310 of the tube body 320 when the tube body 320 routes the ribbon stack 110 along a curved path. The fiber optic ribbons 100 may thereby be relieved from compressive loads when the ribbon stack 110 is routed along the curved path. As the ribbons $100_1$-$100_n$ alternate positions due to the twist imparted by the tube 300, excess length accumulation of any of the fiber optic ribbons 100 is avoided. The helical twisting imparted by the tube 300 thereby helps in preventing macro-bends from occurring on the ribbon stack 110.

Figure 12:
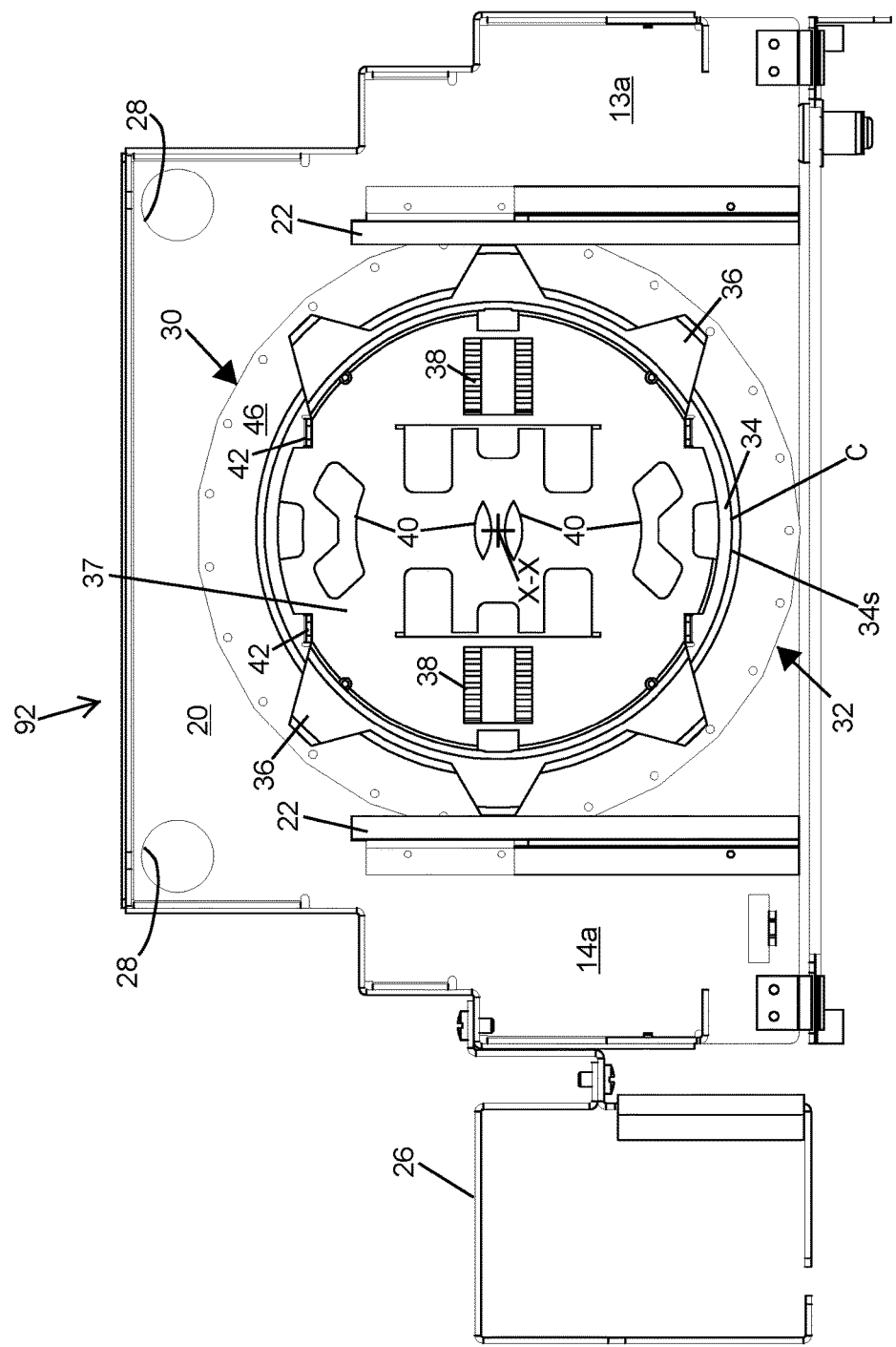
FIG. 12 is a top plan view of the cabinet of FIG. 1 with a top wall removed to expose the tray received within the cabinet.
Figure 13:
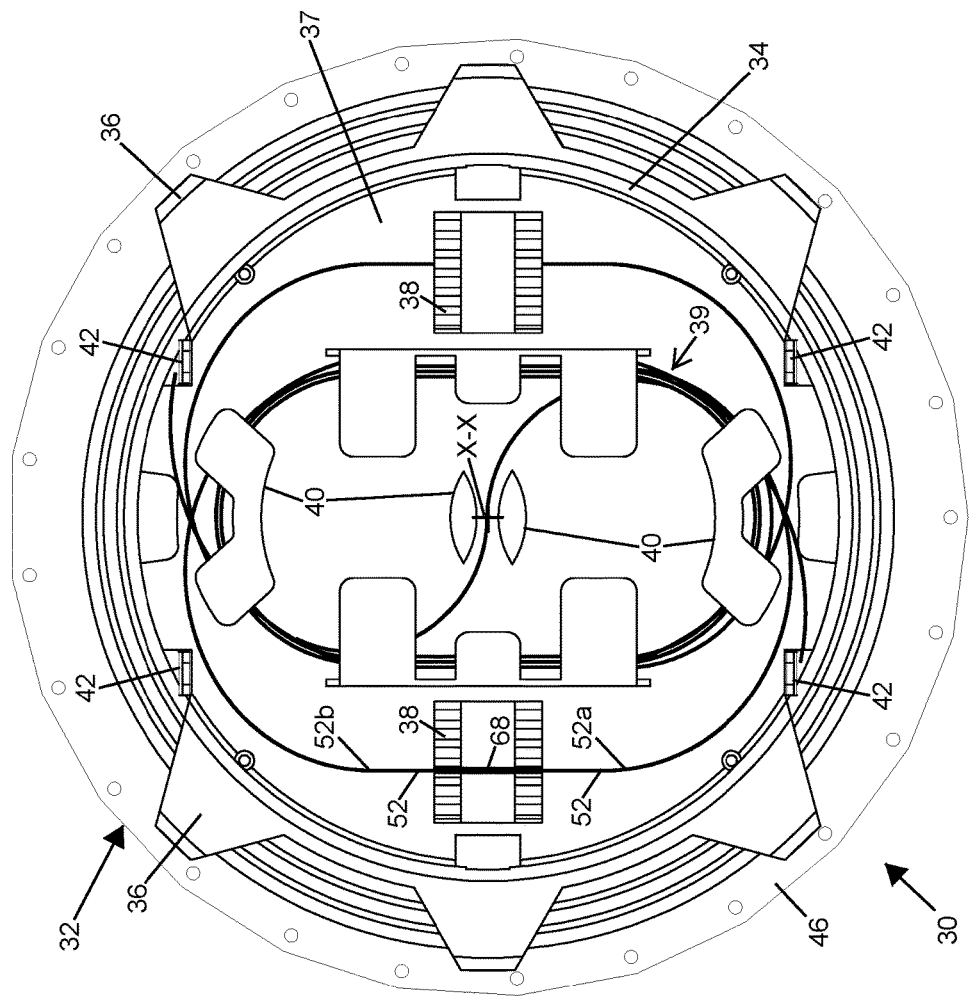
FIG. 13 is a top plan view of a first embodiment of the tray of FIG. 11 with the tube of FIG. 1 wound about the tray, according to the principles of the present disclosure.
Figure 14:
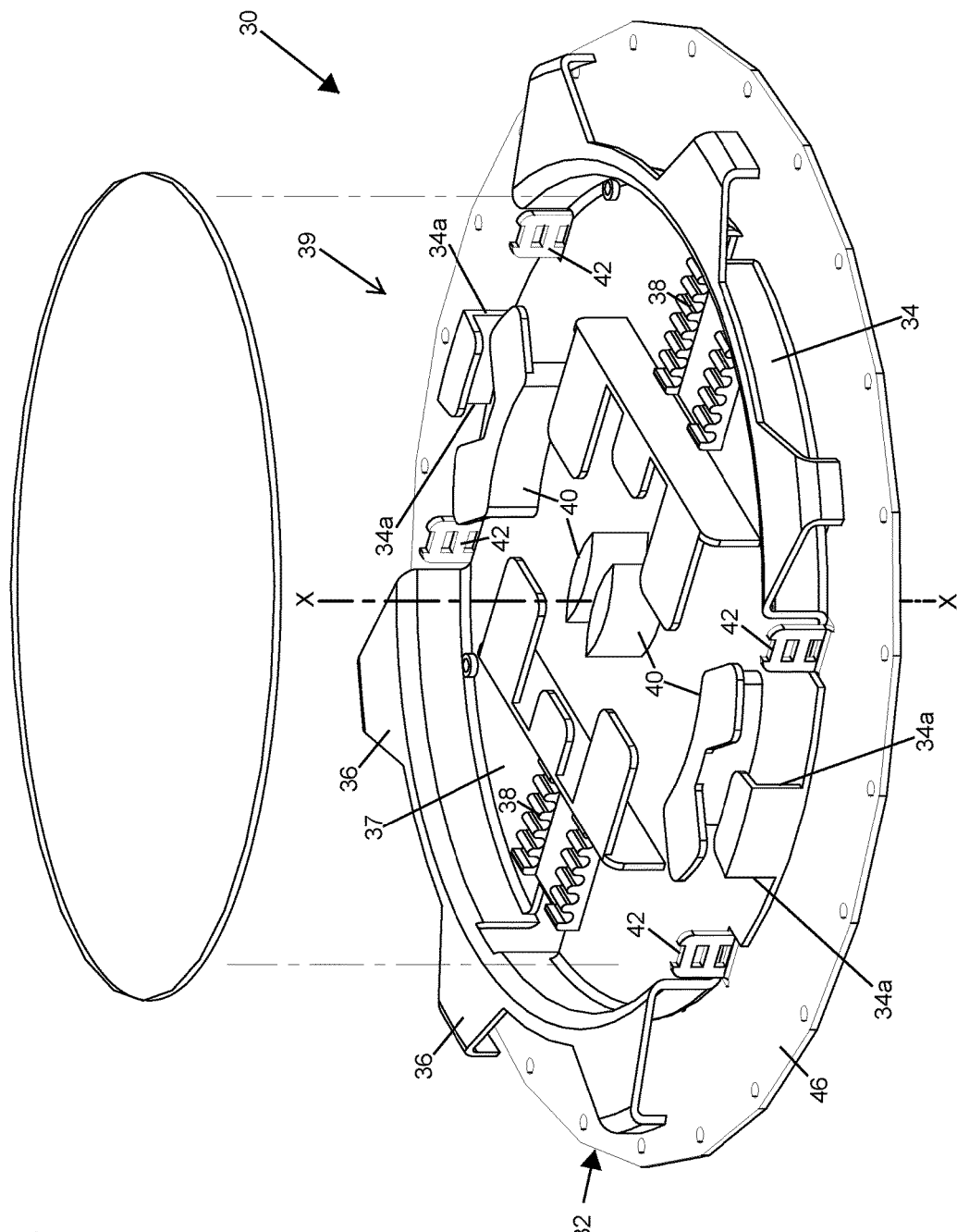
FIG. 14 is an exploded perspective view of the tray of FIG. 13 and a cover, but without the tube of FIG. 1 being wound on the tray.
Figure 15:
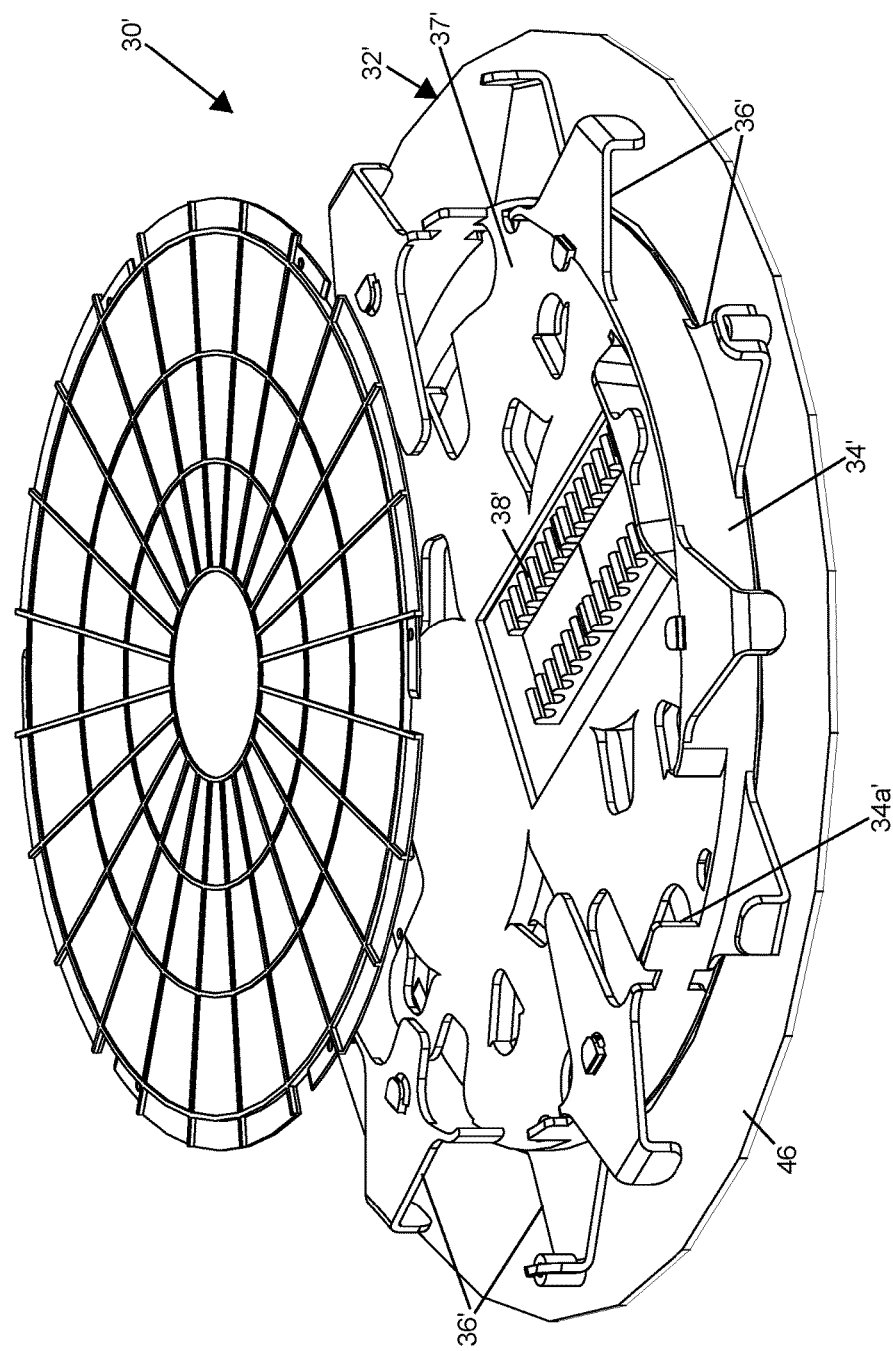
FIG. 15 is a perspective view of a tray and exploded cover of a second embodiment of the tray of FIG. 11, but without the tube of FIG. 1 being wound about the tray.
Figure 16:
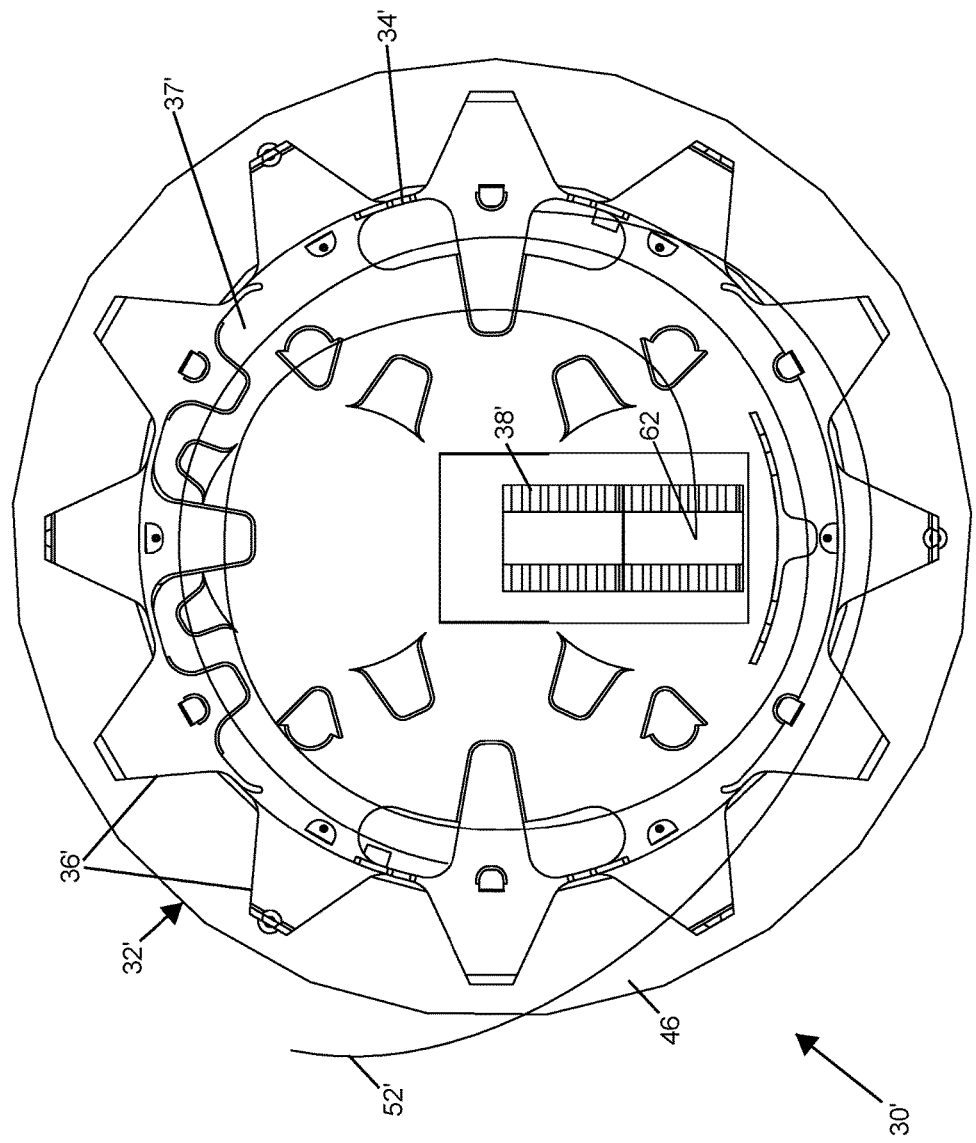
FIG. 16 is a top plan view of the tray of FIG. 15 with the cover removed and showing a fiber wound on the tray.
Figure 17:
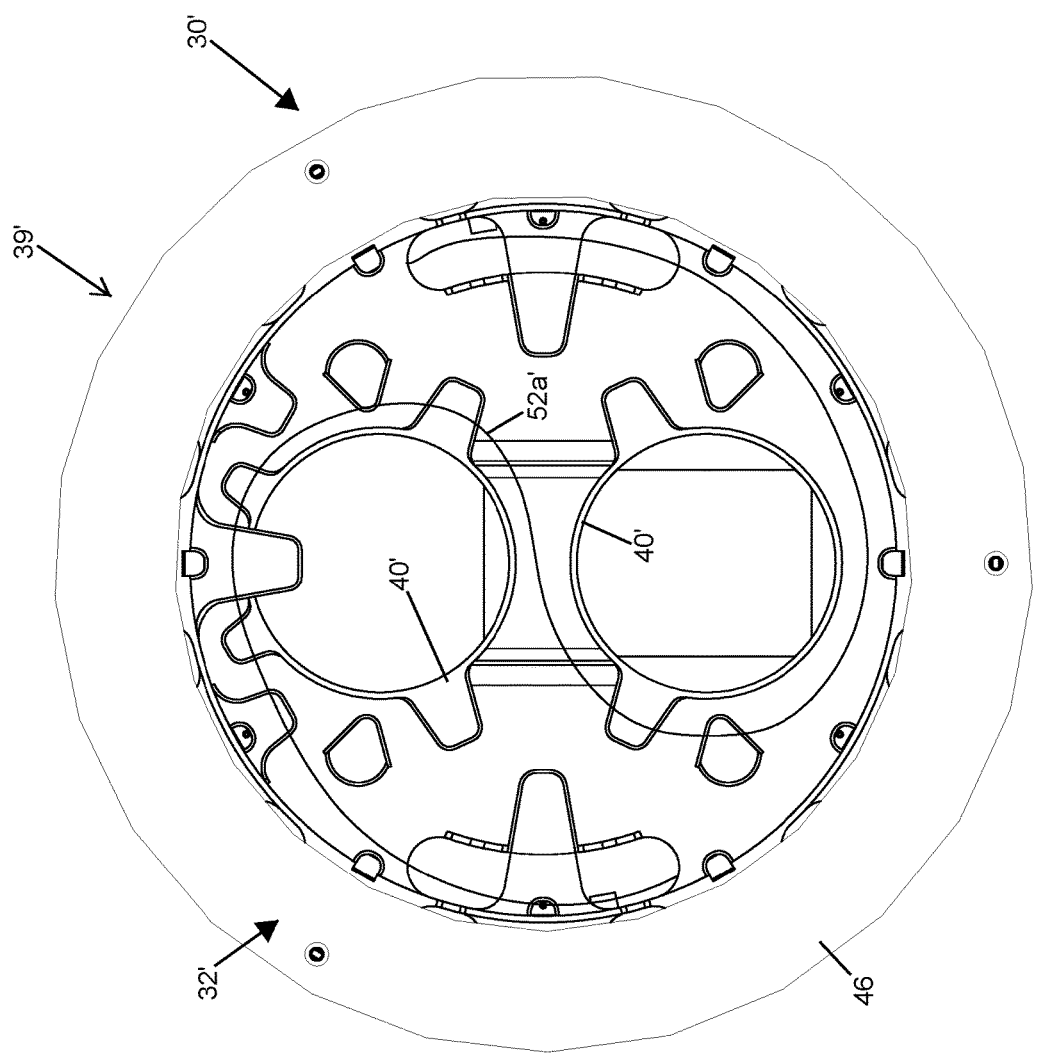
FIG. 17 is a bottom plan view of the tray of FIG. 15 without a cover and showing a fiber wound on the tray.
Figure 18:
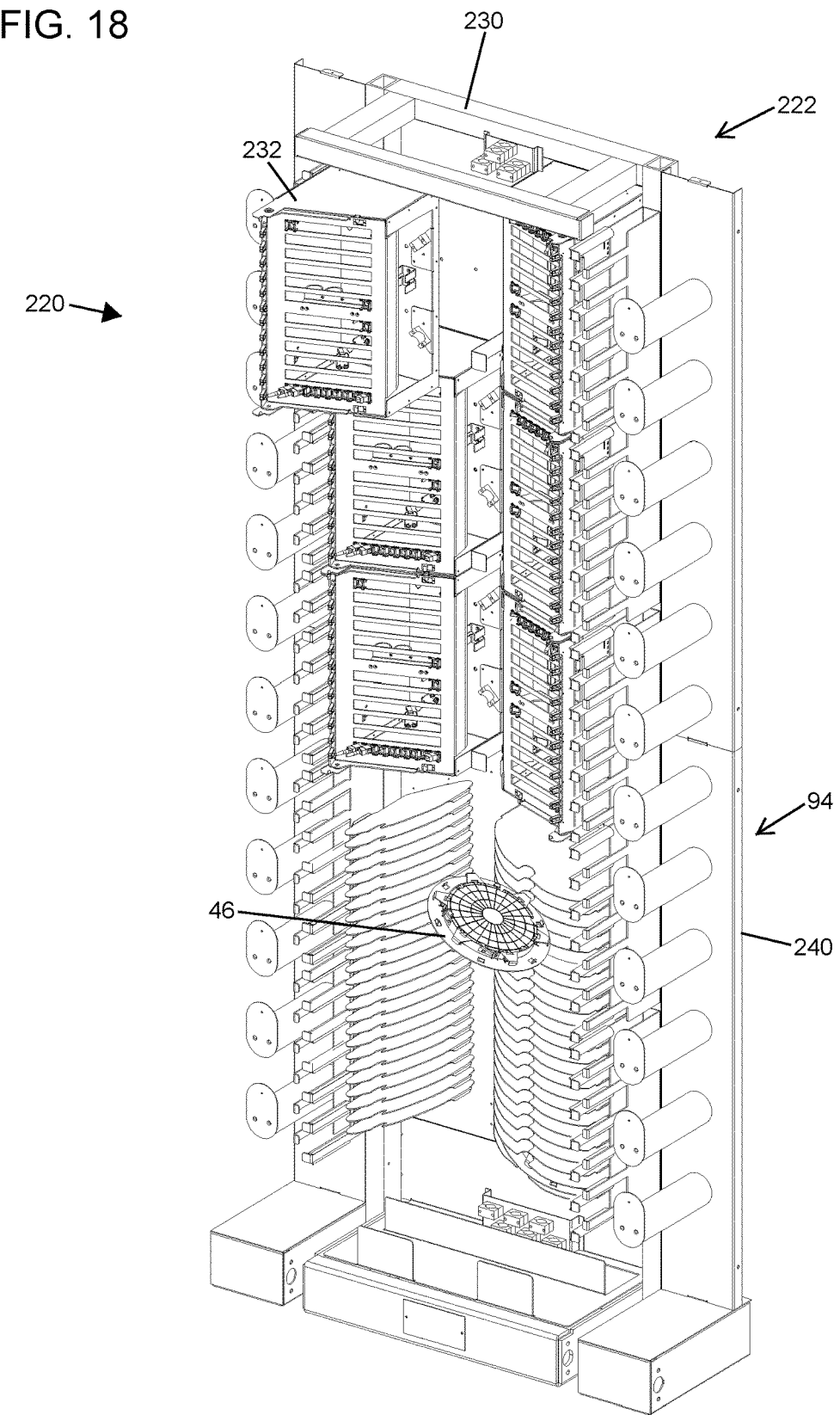
FIG. 18 is a front, top, and right side perspective view of a fiber distribution frame and a tray, with portions shown in exploded view.
Figure 19:
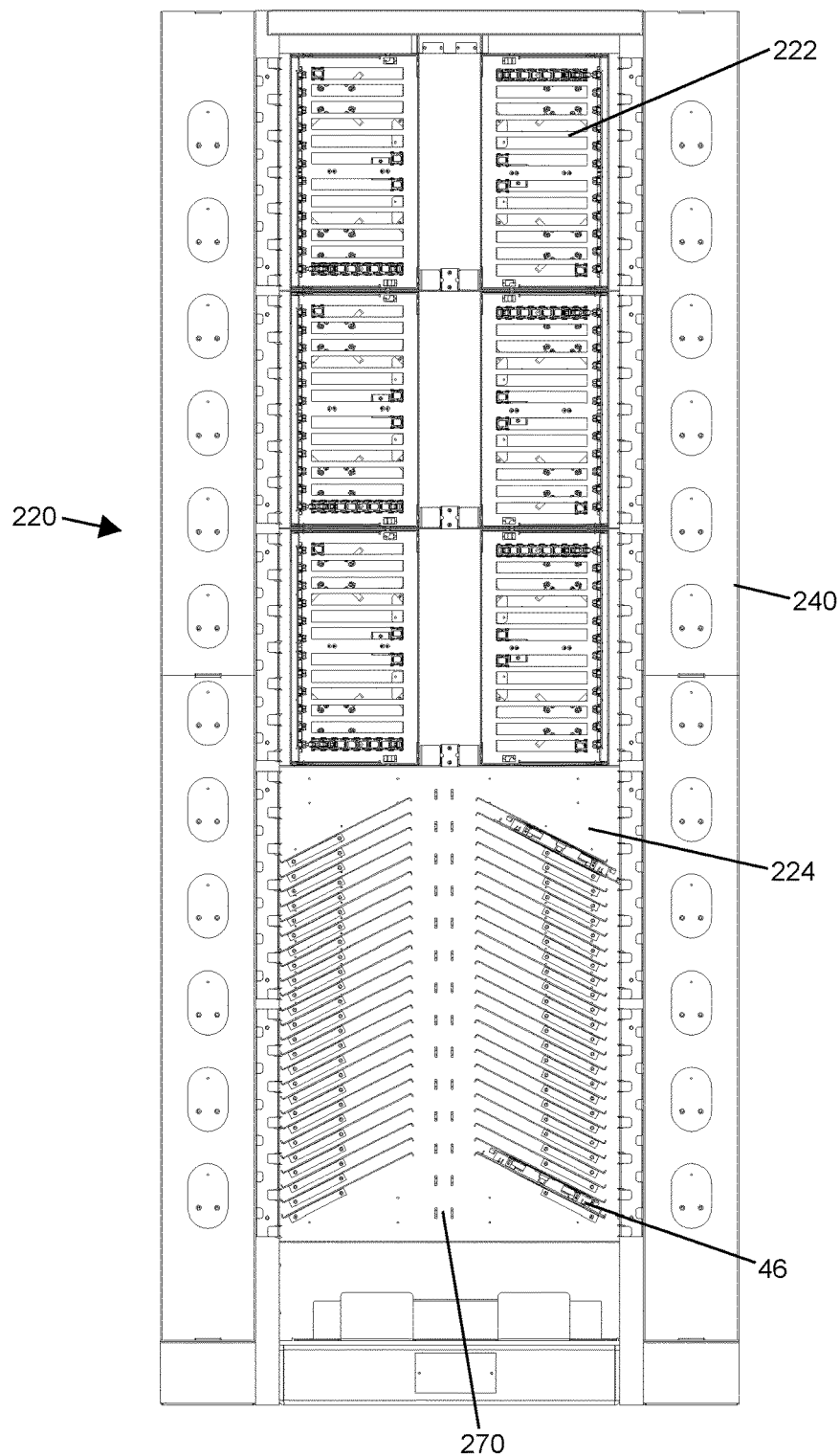
FIG. 19 is a front side elevation view of the frame of FIG. 18.
Figure 20:
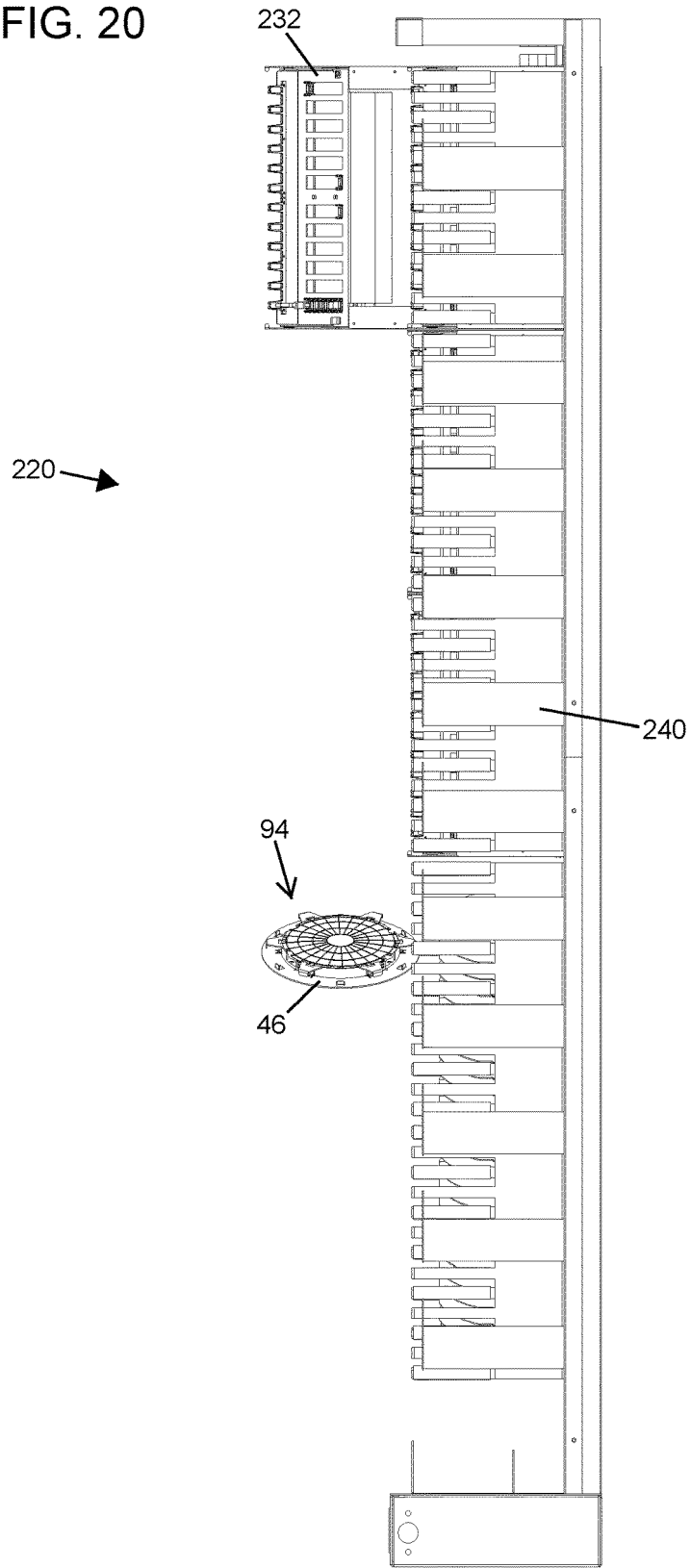
FIG. 20 is a right side elevation view of the frame and tray of FIG. 18.
Figure 21:
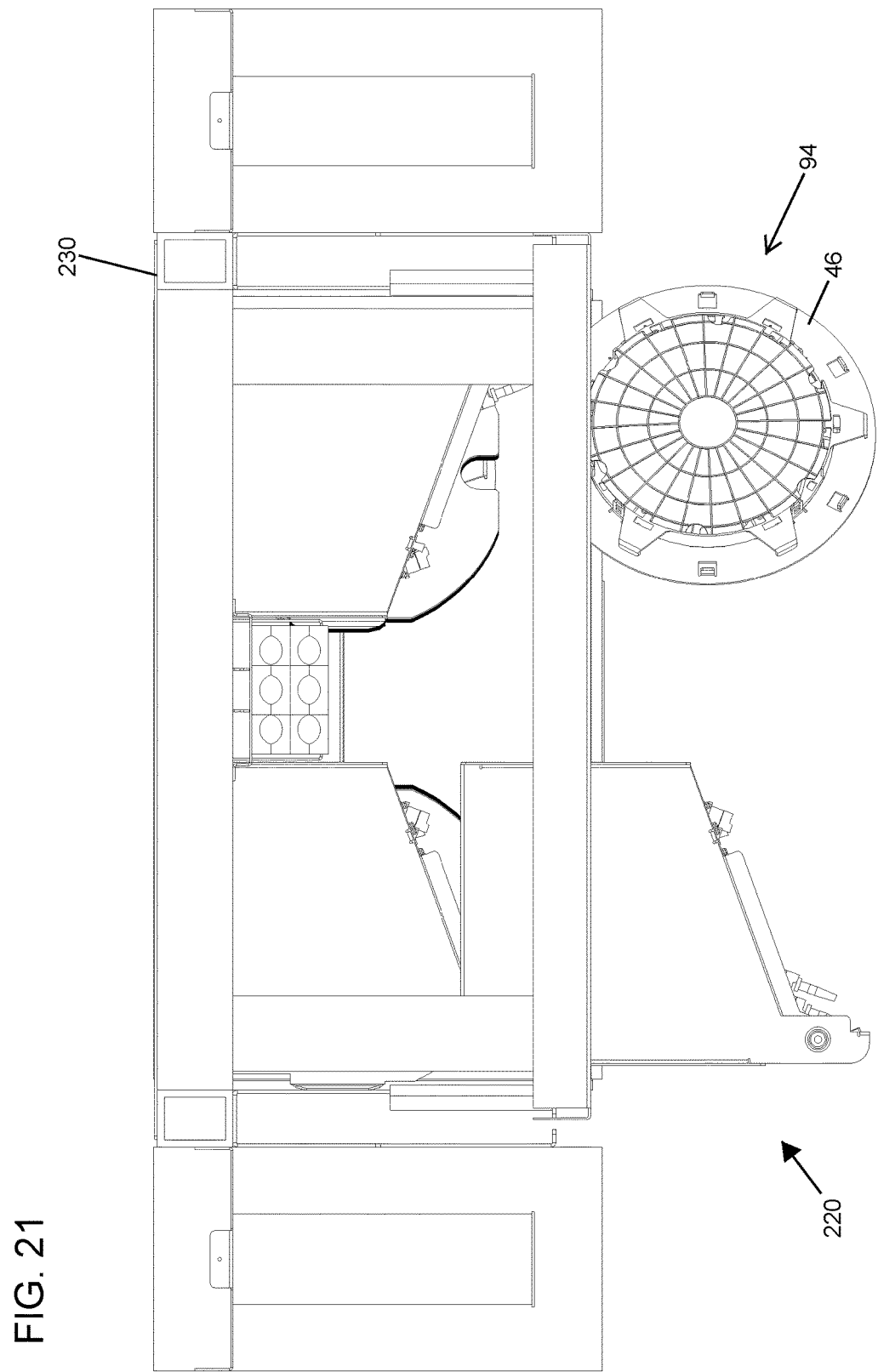
FIG. 21 is a top plan view of the frame of FIG. 18.
Figure 22:
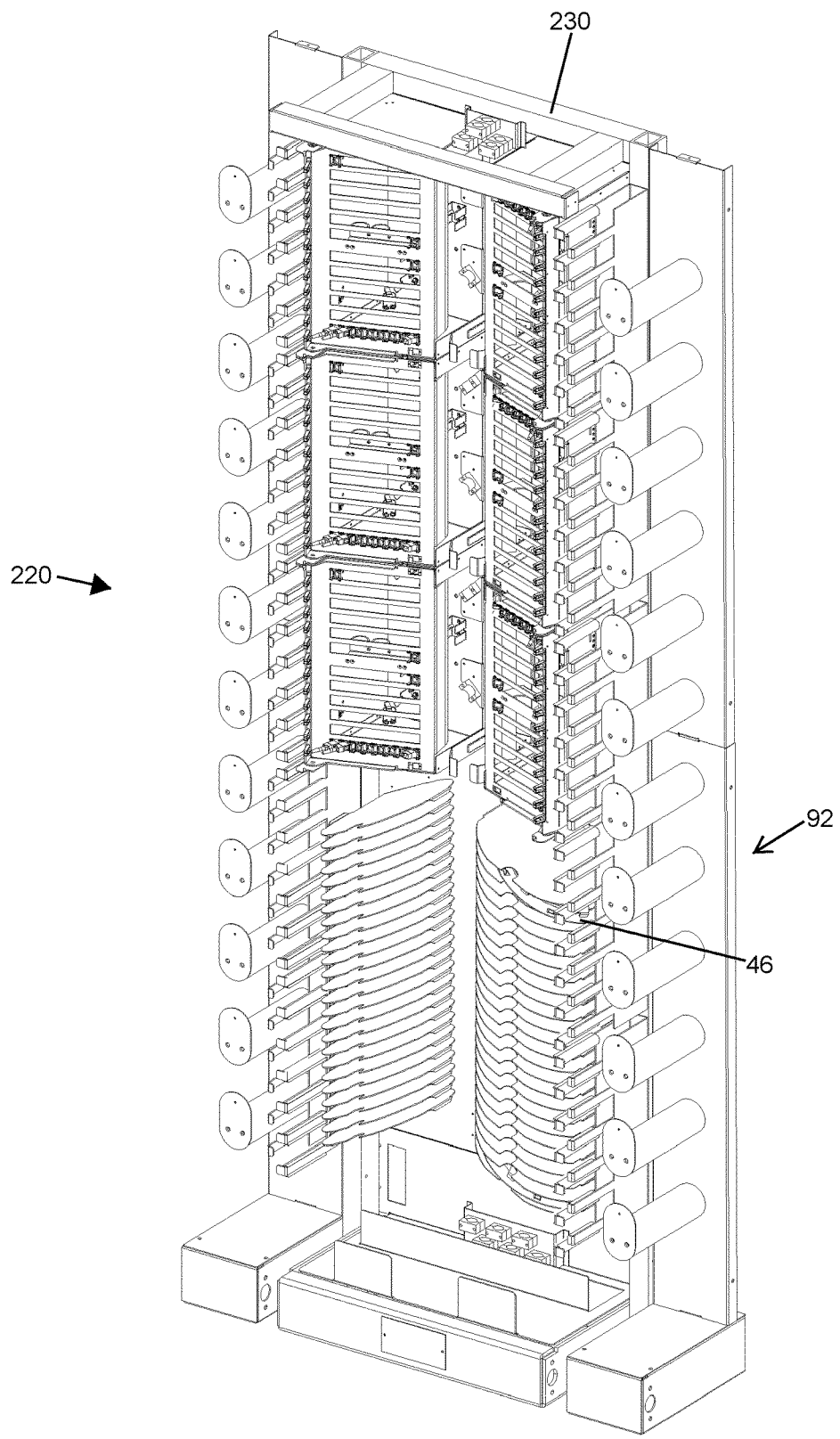
FIG. 22 is a front, top, and right side perspective view of the frame of FIG. 18, with the tray installed.

In certain embodiments, the curved path may be about a winding area/wrapping surface 34s of a spool 34, 34' (see FIGS. 11, 12, and 15). As the top ribbon $100_1$ and the bottom ribbon $100_6$ exchange positions within the tube 300 twice every pitch length Pt of the tube 300, length differences are canceled out between the top ribbon $100_1$ and the bottom ribbon $100_6$ as a ribbon stack pitch Pr is imparted on the ribbon stack 110. As the tube 300 is routed, an axis A2 of the ribbon stack 110 may follow the axis A1 of the tube 300. In embodiments where the tube 300 is routed around a spool (e.g., the spool 34, 34'), the pitch Pr of the ribbon stack 110 and/or the pitch Pt of the tube 300 may have a magnitude of equal to or less than twice a magnitude of a circumference C of the spool 34, 34' (i.e., Pr≤2×C and/or Pt≤2×C). In embodiments where the tube 300 is routed around a spool (e.g., the spool 34, 34'), the pitch Pr of the ribbon stack 110 and/or the pitch Pt of the tube 300 may have a magnitude of equal to or less than four times a magnitude of a radius Rs of the spool 34, 34' times Pi (i.e., Pr≤4×Rs×π and/or Pt≤4×Rs×π). The radius Rs of the spool 34 is illustrated at FIG. 11.

A method of installing the ribbon stack 110 in the tube 300 will now be described, according to the principles of the present disclosure. The method includes providing the plurality $100_1$-$100_n$ of the ribbons 100, providing the tube 300, inserting the first end 102 of each of the fiber optic ribbons 100 into the second end 304 of the tube 300, feeding each of the ribbons 100 into the second end 304 of the tube 300 until the first ends 102 of the ribbons 100 protrude a desired length beyond the first end 302 of the tube 300, twisting the plurality $100_1$-$100_n$ of the ribbons 100 to match the interior 310 of the tube 300 from the first end 302 to the second end 304 of the tube 300, and holding the plurality $100_1$-$100_n$ of the ribbons 100 in a twisted configuration within the tube 300. The ribbons 100 may be arranged into the ribbon stack 110 prior to the inserting and the feeding. The method may further include bending the tube 300 along a curved path and preventing compressive loads, sufficient to cause macrobends on the ribbon stack 110, from forming within the ribbons 100 by alternating positions of the ribbons 100 relative to the curved path.

Turning now to FIGS. 9-22 a system 90 for routing a stack of fiber optic ribbons 100 will be described in detail, according to the principles of the present disclosure. FIG. 9 illustrates a central location 70 with a plurality of the optical fiber cables 50a, 50x, 50y, 50z connected thereto. The central location 70 may be a data center, a communications hub, a central office, etc. The central location 70 may be remotely located from destinations to which the optical fiber cables 50a, 50x, 50y, 50z are routed. The optical fiber cables 50a, 50x, 50y, 50z may therefore be outdoor cables with heavy cable jackets 54, strength members, etc. The fiber optic cable 50a extends between a first end 56 and a second end 58 located at or adjacent the central location 70. The first end 56 of the cable jacket 54 of the cable 50a is terminated within a cabinet 10. In other embodiments, the cabinet 10 may be a frame 220, a housing, etc. The cable 50a includes one or more ribbons 100 that may be arranged in a ribbon stack 110. In certain embodiments, the fiber optic cable 50a includes a plurality of the ribbon stacks 110.

The second end 58 of the cable jacket 54 of the cable 50a is terminated and secured within the central location 70. The first end 56 of the cable jacket 54 of the cable 50a is terminated at or adjacent the cabinet 10. As depicted, an end portion 66 of the cable jacket 54 of the cable 50a is terminated within the cabinet 10 at an attachment 360. The ribbons 100 and/or the ribbon stacks 110 extend substantially beyond the end 56 of the cable jacket 54 of the cable 50a. The ribbons 100 and/or the ribbon stacks 110 that extend from the cable 50a thereby include a jacketed portion 60 that extends through the jacket 54 of the cable 50a.

As depicted, one or more of the tubes 300 are installed over the ribbons 100 and/or the ribbon stacks 110 extending beyond the cable jacket end 56. The tubes 300 may be installed (e.g., post-applied) over the ribbons 100 and/or the ribbon stacks 110 after a portion of the jacket 54 of the cable 50 has been removed, thereby creating the end 56 of the cable jacket 54. As depicted, one of the ribbon stacks 110 is inserted in one of the tubes 300. The one of the ribbon stacks 110 is thereby carried within the tube 300 for routing the ribbon stack 110 within the cabinet 10. The ribbon stack 110 within the tube 300 may be formed from loose ribbons 100 within the cable 50a that are combined within the tube 300. The ribbon stack 110 within the tube 300 may be formed from the ribbon stacks 110 and/or the ribbons 100 from the cable 50a.

Ribbons 100 and/or ribbons stacks 110 from another cable 50b may also be included in the ribbon stack 110 of the tube 300. The tube 300 may guide the ribbon stack 110 from the second end 304 of the tube 300 (see FIG. 9) to the first end 302 of the tube 300 (see FIG. 11). The ribbon stack 110, the ribbons 100, and/or the optical fibers 52 may extend beyond the end 302 of the tube 300 (see FIG. 13).

The tubes 300 may be used as furcation tubes. The tubes 300 may route the ribbons 100 and/or the ribbon stacks 110 from the cable 50 toward optical components, optical connections, etc. Multiple tubes 300 may branch out from the cable 50, each of the tubes 300 may carry some of the ribbons 100 and/or the ribbon stacks 110 from the cable 50.

A second end portion 324 may be secured to the cabinet 10 at an attachment 340 (see FIGS. 9 and 10). A first end portion 322 may be secured at a component (e.g., a splice tray 30, 30', 46) within the cabinet 10, the frame 220, etc. (see FIG. 11). As illustrated at FIGS. 9 and 10, the first end 56 of the cable jacket 54 of the cable 50a is spaced from the second end 304 of the tube 300 by a distance D. In other embodiments, the end 304 of the tube 300 may be immediately adjacent the end 56 of the jacket 54 of the cable 50a.

As depicted at FIGS. 9 and 10, the ribbons 100 and/or the ribbon stacks 110 of the cables 50a, 50b may be routed into one or more of the tubes 300 (e.g., tubes 300a, 300b, 300c, 300d). Each of the cables 50, 50a, 50b may be secured at one or more of the attachments 360 (and not necessarily the same attachment 360). Each of the tubes 300, 300a, 300b, 300c, 300d may be secured at one or more of the attachments 340 (and not necessarily the same attachment 340). The tube 300a extends between a first end 302, 302a and a second end 304, 304a. Likewise, the tube 300b extends between a first end 302, 302b and a second end 304, 304b. Similarly, the tube 300c extends between a first end (not shown) and a second end 304, 304c. The tube 300d extends between a first end (not shown) and a second end 304, 304d.

One or more of the tubes 300 may be routed to a component (e.g., the splice tray 30, 30', 46) within the cabinet 10 or frame 220. As depicted, the tubes 300a and 300b' are routed to the splice tray 30, 30'. As depicted at FIG. 9, the tube 300a includes a ribbon stack 110a with a ribbon 100a that extends from the cable 50a. The tube 300b' may continue as the tube 300b, 300c, or 300d, depending on the embodiment. The ribbon stack 110a may be accompanied by a ribbon stack 110b, a ribbon stack 110c, and/or a ribbon stack 110d. As depicted, the ribbon stack 110b with a ribbon 100b extends from the cable 50a. As also depicted, the ribbon stacks 110c and 110d extend from the cable 50b. In the depicted embodiment, the splice tray 30, 30' includes a wrapping circumference 34c about which the tubes 300a and 300b' are wrapped.

As depicted at FIG. 9, the splice trays 30, 30' are housed within an interior 20 of the cabinet 10. As depicted at FIG. 11, the splice trays 30, 30' may be removed from the interior 20 of the cabinet 10. The splice trays 30, 30' may be installed and removed from the cabinet 10 through an access opening 18. The cabinet 10 includes a plurality of guides 22 with a plurality of rails having grooves 22a. Gaps 24 are provided between the cabinet guides 22, and the gaps 24 extend into the access opening 18.

Side compartments 13a, 14a (i.e., compartments, passages, etc.) may be formed within and/or adjacent the cabinet 10. The gaps 24 between the adjacent guides 22 communicate with the side compartments 13a, 14a. The tubes 300 may thereby pass to the interior 20 of the cabinet 10 by passing through the gaps 24. A retaining clip 26 (e.g., a passage 270', etc.) may be secured to the cabinet 10. The cables 50, 50a, 50b and/or the tubes 300, 300a, 300b, 300c, 300d may be secured within the side compartments 13a, 14a and/or within the retaining clips 26.

The cabinet 10 may include a hole 28 that communicates with the interior 20 such that the cables 50, 50a, 50b and/or the tubes 300, 300a, 300b, 300c, 300d may pass through the holes 28. As depicted, the holes 28 are adjacent the side compartments 13a, 14a, and the tubes 300, 300a, 300b, 300c, 300d pass into the interior 20 through the gaps 24. The splice tray 30, 30' is received within the interior 20 and slidingly engages with the rails of the cabinet guides 22. As depicted, the cabinet 10 may hold four of the splice trays 30, 30'. In other embodiments, the cabinet 10 or the frame 220 (see FIGS. 18-22), may hold less than four or more than four of the splice trays 30, 30', 46.

The splice tray 30, 30' includes a generally flat, plainer circular base 32, 32'. The tray base 32, 32' is sized to extend between the horizontally aligned guides 22 such that the tray base 32, 32' may be received within the grooves 22a of the horizontally aligned guides 22. As illustrated at FIGS. 11-14 the tray base 32 has a center axis X-X which is orthogonal to the plane of the tray base 32. The tray base 32 is rotatable about the axis X-X. The tray base 32, 32' can be received within the grooves 22a of the cabinet guides 22 when the tray base 32, 32' is in any one of its rotational positions about the axis X-X. A spool 34, 34' is provided on the tray base 32, 32'. The spool 34, 34' defines a wrapping surface 34s with the wrapping circumference 34c. The tubes 300 may be wrapped about the wrapping surface 34s of the spool 34, 34'. The spool 34, 34' further includes retaining clips 36, 36' which project radially outwardly from the spool 24. The retaining clips 36, 36' secure the first end portion 322 of the tubes 300.

Positioned on the tray base 32, 32' and contained within an interior 37, 37' of the spool 34, 34' are splice holders 38, 38'. The splice holders 38, 38' are positioned on diametrically opposed sides of the axis X-X. Routing guides 40, 40' are also positioned within the interior 37, 37' of the spool 34, 34'. The routing guides 40, 40' may route the tubes 300 with the ribbon stack 110 held within the tubes 300. In other embodiments, the ribbon stacks 110, the ribbons 100, and/or the optical fibers 52 may be routed on the routing guides 40, 40'.

As shown, the spool 34, 34' is not a complete cylinder but only portions of a cylindrical wall such that gaps 34a, 34a' are provided through the spool 34. At each of the gaps 34a, a plurality of tie clips 42 are provided. The tie clips 42 permit a tie mechanism (such as a string, tie, cord, etc.) to be attached to the tie clip 42 and the adjacent tube 300. The gaps 34a, 34a' in combination with the cable routing guides 40, 40' define fiber pathway guides for passing an optical fiber 52 from the tubes 300 into the interior 37, 37' of the spool 34, 34'. Individual fibers 52 may thereby be passed to the splice holders 38, 38'. Individual ribbons 100 may likewise be passed to the splice holders 38, 38'.

When splicing two fibers or ribbons together, it is desirable that the two fibers or ribbons face one another in optical alignment. In the event that all tubes 300 are wound on the spool 34, 34' in the same direction with a clockwise winding (see arrow A at FIG. 11) on the spool 34, 34', it is necessary that one of the fibers 52 or the ribbons 100 of the pair to be spliced is realigned and reversed in direction so that it can serve as an opposing mating fiber 52a, 52a' or a mating ribbon. The internal cable routing guides 40, 40' permit a fiber 52 or a ribbon 100 to reverse its direction within the interior 37, 37' of the spool 34, 34' so that it can be accurately aligned with the mating fiber 52a, 52a' or mating ribbon.

With the construction thus described, the guide tubes 300 may be passed into the interior 20 of the cabinet 10. The guide tubes 300 may be passed to either of the side compartments 13a, 14a. With the splice tray 30 removed from the cabinet 10 in a removed configuration 94 (see FIG. 11), the tubes 300 may end at the end 302 and thereby expose multiple fibers 52, 52a and/or ribbons 100 contained within each of the tubes 300. The first end portion 322 of the tubes 300 may be secured to the tie clips 42. The individual fibers 52 and/or ribbons 100 may be passed through the gaps 34a into the interior 37 of the spool 34 and routed through the cable routing guides 40 such that one of the fibers 52 or ribbons 100 is passed to the splice holder 38 in one direction and a mating fiber 52a or a mating ribbon 100 has its direction reversed through the cable routing guides 40 (i.e., a rotation path reversing area 39, 39') such that it approaches the splice holder 38 in an opposite and aligned direction with the fiber 52 or ribbon 100. Accordingly, the fibers 52, 52a may be spliced together with a splice 68 (e.g., a butt splice) held in the splice holder 38 (as is conventional). Likewise, the ribbons 100 may similarly be spliced together with the splice 68 held by the splice holder 38. The cable routing guides 40 prevent excess bending of the fibers 52, 52a and/or ribbons 100.

After all splices have been accomplished, the tray 30, 30', 46 is rotated about its axis X-X. As a result of such rotation, the tubes 300 are wound around the spool 34, 34' about the wrapping surface 34s. While the tubes 300 are being wound onto the spool 34, 34', the tray 30, 30' approaches the guides 22. When the tray 30, 30' meets the guides 22, the tray base 32, 32' is slipped into the aligned grooves 22a such that the tray base 32, 32' is slideably received within the guides 22 and into an installed configuration 92 (see FIG. 9).

Turning now to FIGS. 18-22, the frame 220 is illustrated. The frame 220 includes a termination area 222, a splice area 224, a rack 230, a termination module 232, a cable management panel 240, and a central passage 270. The rack 230 supports holding a plurality of splice trays 46. The splice trays 46 are similar to or the same as the splice trays 30, 30'. The frame 220 may include two vertical stacks of holders for the splice trays 46. Each of the splice trays 46 includes structure (e.g., the central passage 270) for holding the end portions 322 of a plurality of the tubes 300 with a ribbon stack 110 within each of the tubes 300. The splice trays 30, 30', 46 may be similarly rotated in and out of the frame 220 while winding and unwinding the tubes 300 from the spool 34, 34' of the splice trays 30, 30', 46. Cables 50, 50a, 50b may similarly enter the frame 220 and be terminated and secured at the frame 220 (e.g., at the central passage 270) as they were terminated at the cabinet 10. The end portion 66 of the jacket 54 of the cables 50, 50a, 50b may be similarly secured to the frame 220.

What is claimed is:

1. An optical fiber ribbon guide tube comprising:
   a tube body extending from a first end to a second end along a central longitudinal axis, the tube body including:
   a round exterior extending from the first end to the second end of the tube body along the central longitudinal axis; and
   an interior with a rectangular cross-section, the rectangular cross-section twisting about the central longitudinal axis as the interior extends from the first end to the second end of the tube body, and the rectangular cross-section defining opposing sides about the central longitudinal axis;

wherein the opposing sides are configured to engage a ribbon stack and thereby twist the ribbon stack when the ribbon stack is inserted through the interior of the tube body; and wherein the tube body is adapted to route the ribbon stack along a curved path.

2. The optical fiber ribbon guide tube of claim 1, wherein the tube body is monolithic and extends uninterrupted between the interior and the round exterior.

3. The optical fiber ribbon guide tube of claim 1, wherein the rectangular cross-section continuously twists about the central longitudinal axis a revolution per pitch length and wherein the pitch length ranges from 26 inches to 34 inches.

4. The optical fiber ribbon guide tube of claim 1, wherein the rectangular cross-section includes fillets at corners of the rectangular cross-section.

5. An assembly of an optical fiber ribbon guide tube and a stack of fiber optic ribbons, the assembly comprising:

a tube body extending from a first end to a second end along a central longitudinal axis, the tube body including:
  a round exterior extending from the first end to the second end of the tube body along the central longitudinal axis; and
  an interior with a rectangular cross-section, the rectangular cross-section twisting about the central longitudinal axis as the interior extends from the first end to the second end of the tube body, and the rectangular cross-section defining opposing sides about the central longitudinal axis; and a plurality of the fiber optic ribbons held in a ribbon stack by the rectangular cross-section of the tube body, each of the fiber optic ribbons including:
  a plurality of optical fibers extending from a first end to a second end;

wherein the first ends of the plurality of the optical fibers extend beyond the first end of the tube body;

wherein the second ends of the plurality of the optical fibers extend beyond the second end of the tube body;

wherein the opposing sides engage the ribbon stack and thereby twist the ribbon stack from the first end to the second end of the tube body; and wherein the plurality of the fiber optic ribbons slip relative to each other within the interior of the tube body when the tube body routes the ribbon stack along a curved path and the fiber optic ribbons are thereby relieved from compressive loads when the ribbon stack is routed along the curved path.

6. The assembly of claim 5, wherein the curved path is a wrapping circumference of a spool along which the tube body is wrapped, wherein the rectangular cross-section twists about the central longitudinal axis a revolution per pitch length, and wherein the pitch length is less than or equal to twice the wrapping circumference.

7. The assembly of claim 5, wherein the rectangular cross-section includes fillets at corners of the rectangular cross-section and wherein sides of the fiber optic ribbons each include a radius matching the fillets in size.

8. A method of installing a stack of fiber optic ribbons in a ribbon guide tube, the method comprising:
providing a plurality of the fiber optic ribbons;
providing a tube body extending from a first end to a second end along a central longitudinal axis, the tube body including a round exterior extending from the first end to the second end of the tube body along the central longitudinal axis;

inserting a first end of each of the plurality of the fiber optic ribbons into the second end of the tube body;

feeding each of the plurality of the fiber optic ribbons into the second end of the tube body until the first ends of the plurality of the fiber optic ribbons protrude a desired length beyond the first end of the tube body;

twisting the plurality of the fiber optic ribbons to match an interior of the tube body with a twisted rectangular cross-section extending from the first end to the second end of the tube body; and holding the plurality of the fiber optic ribbons in a twisted configuration with the twisted rectangular cross-section of the tube body.

9. The method of claim 8, wherein the plurality of the fiber optic ribbons is arranged in a ribbon stack prior to the inserting and the feeding.

10. The method of claim 8, further comprising:
bending the tube body along a curved path;
preventing compressive loads within the fiber optic ribbons from forming by alternating positions of the fiber optic ribbons relative to the curved path.

11. A system for routing a stack of fiber optic ribbons, the system comprising:

a fiber optic cable including a jacket and a ribbon stack, the jacket extending from a first end to a second end, the ribbon stack extending from a first end to a second end, a jacketed portion of the ribbon stack surrounded by the jacket from the first end of the jacket to the second end of the jacket; and a fiber guide tube extending from a first end to a second end along a central longitudinal axis, the fiber guide tube positioned between the first end of the jacket and the first end of the ribbon stack, the fiber guide tube including a round exterior and an interior with a rectangular cross-section, the rectangular cross-section twisting about the central longitudinal axis as the interior extends from the first end of the fiber guide tube to the second end of the fiber guide tube, a tubed portion of the ribbon stack surrounded and twisted by the interior of the fiber guide tube from the first end of the fiber guide tube to the second end of the fiber guide tube.

12. The system of claim 11, wherein the first end of the jacket is terminated in a housing, wherein the second end of the fiber guide tube is also terminated in the housing, wherein a first end portion of the jacket adjacent the first end of the jacket is attached to the housing, and wherein a second end portion of the fiber guide tube adjacent the second end of the fiber guide tube is also attached to the housing.

13. The system of claim 12, wherein the first end of the jacket is spaced from the second end of the fiber guide tube by a distance.

14. The system of claim 11, further comprising a spool and a housing, wherein the housing stores the spool when the system is at a first configuration, wherein at least a portion of the spool is removed from the housing when the system is at a second configuration, wherein at least a portion of the fiber guide tube is wrapped about the spool when the system is at the first configuration, and wherein at least a portion of the fiber guide tube is unwrapped from the spool when the system is at the second configuration.

15. The system of claim 14, wherein the spool includes a wrapping circumference along which the fiber guide tube is wrapped, wherein the rectangular cross-section twists about the central longitudinal axis a revolution per pitch length, and wherein the pitch length is less than or equal to twice the wrapping circumference.

16. The system of claim 15, wherein the pitch length ranges from 26 to 34 inches.

17. The system of claim 14, further comprising a fiber connection management area within a wrapping circumference of the spool, wherein the ribbon stack is routed to the fiber connection management area and optically connected within the fiber connection management area.

18. The system of claim 11, wherein the rectangular cross-section includes fillets at corners of the rectangular cross-section.

19. The system of claim 11, wherein the ribbon stack includes a plurality of fiber optic ribbons, wherein each of the fiber optic ribbons includes a plurality of optical fibers extending from a first end to a second end, respectively.

20. The system of claim 19, further comprising a spool, a housing, a fiber connection management area within a wrapping circumference of the spool, and a rotation path reversing area within the wrapping circumference of the spool, wherein the housing stores the spool when the system is at a first configuration, wherein at least a portion of the spool is removed from the housing when the system is at a second configuration, wherein at least a portion of the fiber guide tube is wrapped about the spool when the system is at the first configuration, wherein at least a portion of the fiber guide tube is unwrapped from the spool when the system is at the second configuration, wherein at least one of the plurality of optical fibers is routed through the rotation path reversing area and into the fiber connection management area, and wherein the first end of the at least one of the plurality of optical fibers is optically connected to another optical fiber at a butt splice within the fiber connection management area.

* * * * *